Figures 1, 2:
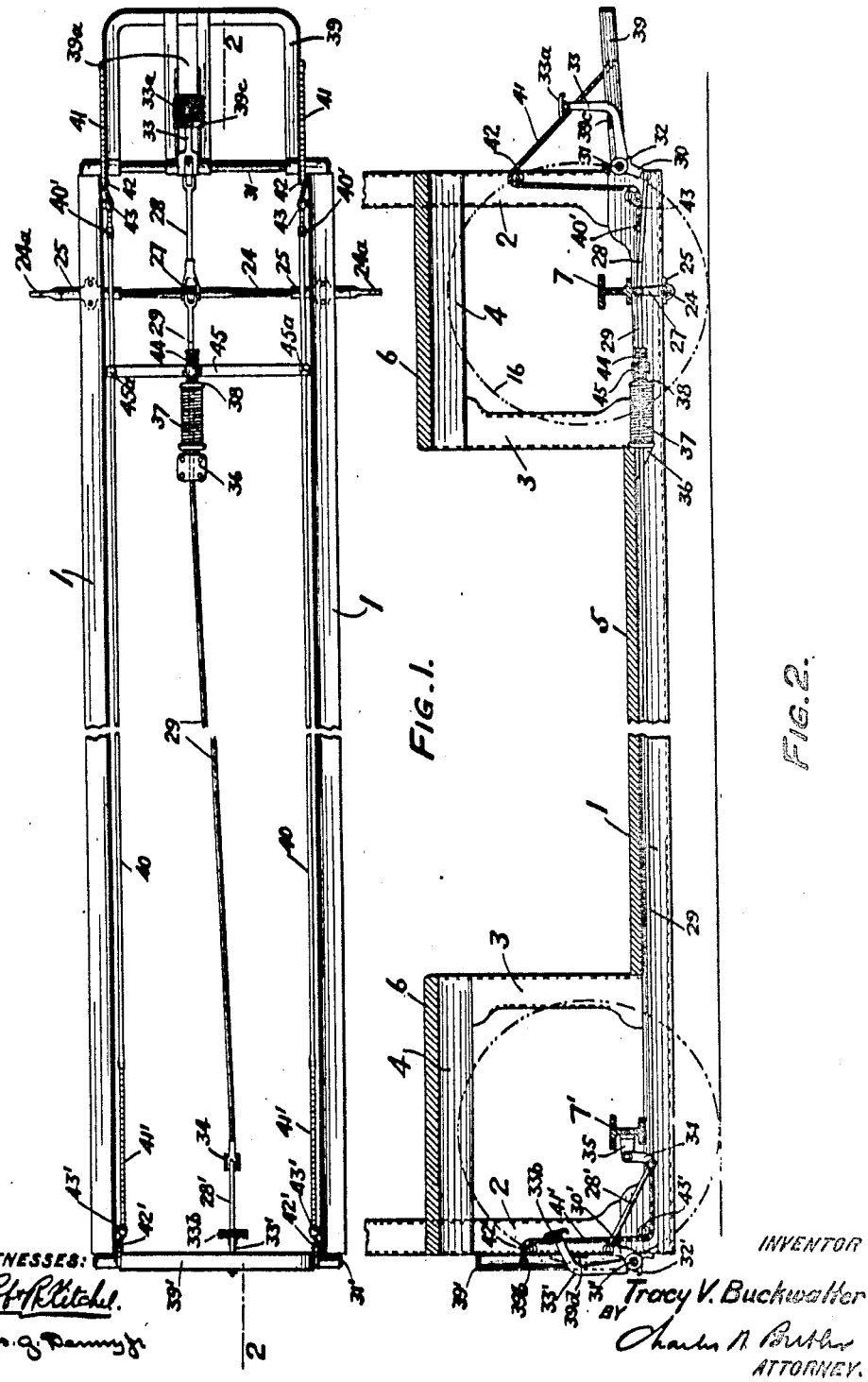

T. V. BUCKWALTER.
BRAKING MECHANISM FOR VEHICLES.
APPLICATION FILED MAR. 30, 1910.

1,058,719.

Patented Apr. 15, 1913.
3 SHEETS—SHEET 1.

WITNESSES:

INVENTOR
Tracy V. Buckwalter
BY
Charles N. Butler
ATTORNEY.

T. V. BUCKWALTER.
BRAKING MECHANISM FOR VEHICLES.
APPLICATION FILED MAR. 30, 1910.
1,058,719.
Patented Apr. 15, 1913.
3 SHEETS—SHEET 2.
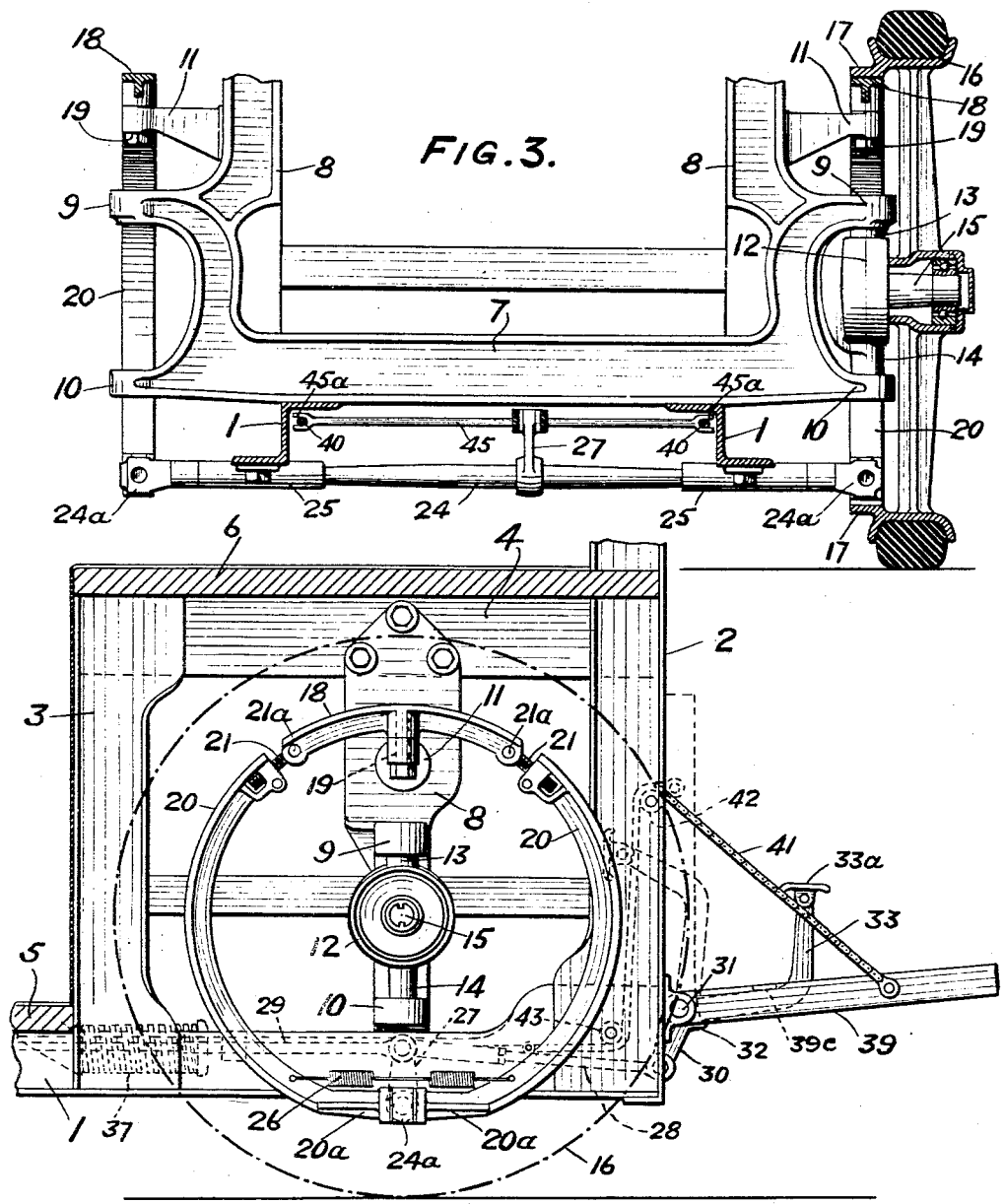
WITNESSES:
INVENTOR
Tracy V. Buckwalter
BY
Charles N. Butler
ATTORNEY.

T. V. BUCKWALTER.
BRAKING MECHANISM FOR VEHICLES.
APPLICATION FILED MAR. 30, 1910.
1,058,719.
Patented Apr. 15, 1913.
3 SHEETS—SHEET 3.
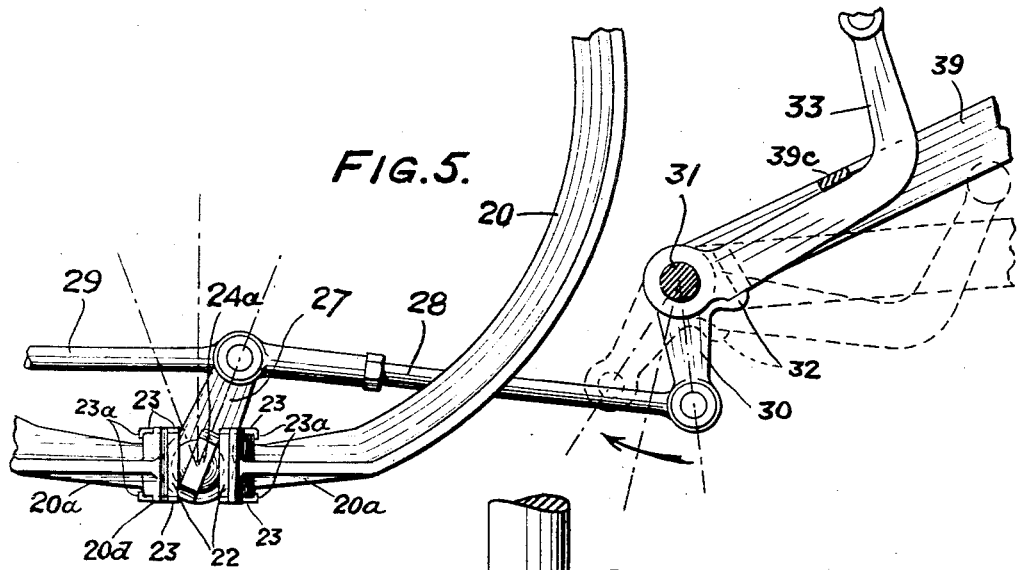
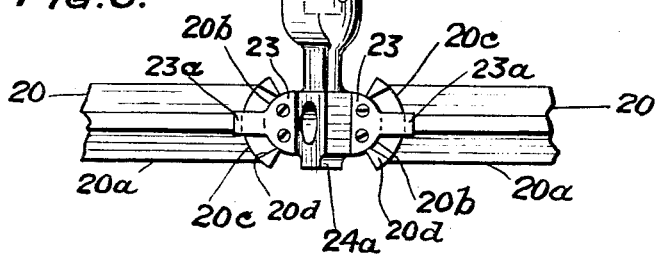
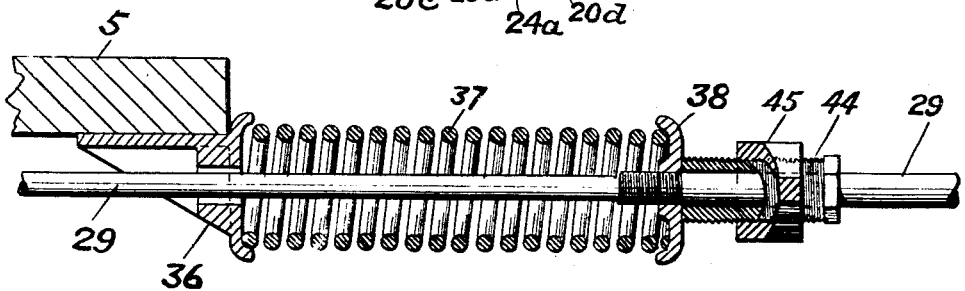
WITNESSES:
INVENTOR
Tracy V. Buckwalter
BY
Charles N. Butler
ATTORNEY.

UNITED STATES PATENT OFFICE.

TRACY V. BUCKWALTER, OF ALTOONA, PENNSYLVANIA.

BRAKING MECHANISM FOR VEHICLES.

1,058,719.  Specification of Letters Patent.  Patented Apr. 15, 1913.

Application filed March 30, 1910. Serial No. 552,352. REISSUED

*To all whom it may concern:*

Be it known that I, TRACY V. BUCKWALTER, a citizen of the United States, residing at Altoona, in the county of Blair and State of Pennsylvania, have invented certain Improvements in Braking Mechanisms, of which the following is a specification.

My invention relates to braking mechanisms for vehicles. It is applicable to wheels having independent axes of oscillation and it is designed particularly for application to motor truck wheels connected by knuckles to the truck frames. Its leading characteristics reside in its improved mechanism operative regardless of the positions of the wheels, to apply the brakes automatically, and also to release them manually and to apply them from either end of the truck. In the preferred construction the automatically acting brakes, which normally hold the truck wheels, are released by the weight of the operator on either of two platforms at opposite ends of the truck and connected so that when one is depressed the other is elevated.

The characteristic construction and functions are disclosed in the following description and the accompanying drawings in illustration thereof.

In the drawings, Figure 1 is a sectional plan view representing parts of a truck frame with features of my invention applied thereto; Fig. 2 is a sectional view taken on the line 2—2 of Fig. 1; Fig. 3 is a transverse sectional elevation representing parts of the frame and a wheel with features of the invention connected therewith; Fig. 4 is a sectional side elevation of an end of the truck; Fig. 5 is a side elevation representing details of the brake; Fig. 6 is a sectional plan view representing details whereby the brake is operated regardless of the position of the wheel; and Fig. 7 is a sectional view of the brake rod with connections for effecting its automatic movement.

The truck, as illustrated in the drawings, has a frame comprising the longitudinal sills or beams 1 with end housings formed by uprights 2 and 3 fixed to the ends of each sill and longitudinal beams 4 respectively connecting a pair of uprights, the beams supporting the respective floorings 5 and 6.

Axles 7 and 7' are carried upon the sills 1 and have connected therewith uprights 8 which are fixed to the beams 4, the uprights having thereon the bearings 9, 10, and 11.

Knuckles 12 have their vertical bearings 13 and 14 journaled in the bearings 9 and 10. The knuckles support the frame through the engagement of their spindles 15 with the traction wheels 16, each wheel having fixed thereto a friction ring or cylindrical flange 17, which is intersected by the axis of the knuckle.

A circular segment 18 is supported by each bearing 11 within the ring 17 and is pivotally connected to the bearing by a pintle 19. Circular segments 20, providing brake shoes disposed within the rings, are hinged in adjustable relation to each segment 18, by bolts 21 which are screwed into the shoes 20 and are pivotally connected to the segment 18 by the pins 21$^a$. The ends 20$^a$ of the shoes, which are drawn in, are provided with the vertical cylindrical bearings 20$^b$ and the concentric cylindrical bearings 20$^c$. Cylindrical bearing segments 22 are journaled in the respective bearings 20$^b$ and are engaged thereto by the clips 23, the clips being fixed to the ends of the parts 22 and having lugs 23$^a$ thereon which are adapted to engage the surfaces 20$^c$. The rotary movements of the segments 22 are limited by the engagement of the clips with the projections 20$^d$.

A shaft 24, journaled in bearings 25 carried by the sills 1, has the end pieces 24$^a$ fixed thereto and disposed between complementary segments 22. The end pieces 24$^a$ are cams having rectangular cross sections or such character as to spread the segments 22 and apply the shoes 20 to the rings 17 when the shaft 24 is turned. Springs 26 are connected with the shoes 20 and act to draw them together and withdraw them from the rings. The shaft 24 is rocked, to rock the cams 24$^a$, by an arm 27 which is fixed thereon and pivotally connected to the rods 28 and 29. The rod 28 is pivotally connected to a lever arm 30 journaled on a shaft 31 which is carried by the frame, the arm 30 having a lug or arm 32 fixed thereto. A foot lever 33 is journaled on the shaft 31 and is adapted for engagement with the arm 32 to move the arm 30 in the direction of the arrow (Fig. 5); the foot lever on rising being withdrawn from the arm 32 without disturbing the arm 30.

The rod 29 is pivotally connected to a link 34 which is pivoted to a bearing 35 fixed to the end beam 7'. A rod 28' connects the rod 29 and the link 34 with a lever arm 30' journaled on a shaft 31', the latter being carried by the frame. The arm '30' has fixed thereto an arm 32' adapted to be engaged and moved by the foot lever 33' journaled on the shaft 31', the foot lever being withdrawn from the arm 32' on rising.

A bearing 36, through which the rod 29 is adapted to reciprocate, is fixed to the floor 5 and is engaged by one end of a spring 37 on the rod, and a bearing 38 fixed on the rod engages the other end of the spring. This spring acts through its bearings upon the rod 29 and causes it to act through the arm 27 and shaft 24 upon the cams 24ª which are turned thereby to spread the segments 22 and apply the brake automatically.

As the respective vertical axes of oscillation of the wheels 16 lie between the segments 22, about which the parts 16, 17, 18 and 20 turn, the brake mechanism operates with equal efficiency regardless of the position of the wheels.

Platforms 39 and 39', hinged on the respective shafts 31 and 31', are provided with the respective slots 39ª and 39ᵇ through which the respective levers 33 and 33' pass. Cross pieces 39ᶜ and 39ᵈ, fixed to the respective plaforms and intersecting the corresponding slots, are adapted to engage and depress the respective levers 33 and 33' when the platforms are lowered. Pressure upon either platform effects the release of the brakes by bringing the parts 24ª to the vertical position (permitting the shoes 20 to be drawn together by the springs 26), the pressure being communicated through the parts 33, 32, 30, 28, 27 and 24, or through the parts 33', 32', 30', 28', 29 and 24.

The levers 33 and 33' are provided with the shoes 33ª and 33ᵇ to which pressure can be applied, by the operator standing upon the corresponding platform, to apply the brakes, the shoes being engaged by the platforms when the latter are elevated and the foot levers being elevated thereby.

The platforms are connected by the rods 40 and the chains 41 and 41' so that the lowering of one platform elevates the other; the chains being engaged to the sides of the respective platforms and passing over the respective rollers 42, 43, 42' and 43', which are carried by the uprights 2. Consequently when the truck is operated by a driver on a platform at one end of the truck, the platform and foot lever at the other end are elevated and out of the way, withdrawing the braking mechanism from operation from the then rear end.

The rod 29 has a threaded sleeve 44 movable thereon and adapted to engage the bearing 38. This sleeve is screwed into a cross bar 45 having the end bifurcations 45ª between which the rods 40 pass. When the platform 39' is depressed, the bar ends 40' engage the bifurcated ends of the bar 45 and act therethrough upon the sleeve 44 and bearing 38, moving the rod 29 to rock the arm 24 and cam 24ª, whereby the springs 26 are permitted to withdraw the brake shoes 20 and release the brake.

It will be understood that the functions resulting from the operation of the cross bar 45 are supplementary to and may be used alternately with the similar functions resulting from the engagement of the cross piece 39ᵈ with the lever 33'.

Having described my invention, I claim:

1. In a braking mechanism, the combination of a truck having a revoluble wheel adapted to oscillate on an axis transverse to its axis of revolution, with braking means comprising a frictional member adapted to oscillate with said wheel, a bearing member engaged by and relative whereto said frictional member is adapted to oscillate and means operable from each end of said truck for moving said bearing member whereby said frictional member is operated.

2. In a braking mechanism, the combination in a vehicle, of a frictional member having a bearing, a revoluble wheel having a frictional member adapted to be engaged by said frictional member first named, means whereby said wheel and frictional member are adapted to oscillate, a bearing member engaged by and relative to which said bearing first named is adapted to turn, a device adapted to be turned and to move said bearing member and means operable from each end of said vehicle for operating said device.

3. In a braking mechanism, a frictional member having a bearing, a revoluble wheel having a frictional member adapted to be engaged by said frictional member first named, means whereby said wheel and frictional members are adapted to oscillate on an axis transverse to the axis of revolution of said wheel, a bearing member engaged by and upon which said bearing is adapted to turn, and a journaled shaft having a cam thereon by which said bearing member is moved to effect the engagement of said frictional members, and means for automatically disengaging said frictional members.

4. In a braking mechanism, in combination with a traction wheel having a frictional member fixed thereto, a frictional device movable relative to and adapted for engaging said member, said device having a bearing, a bearing member on which the bearing of said device is adapted to turn, a journaled shaft whereby said bearing member is operated, and means for turning said shaft.

5. In a braking mechanism, a revoluble friction member having an axis of oscillation transverse to its axis of revolution, frictional segments adapted to coact with said member and to oscillate therewith, bearing members relative whereto said segments are adapted to turn in their action of oscillation, and means whereby said bearing members are spread and said segments are operated.

6. In a braking mechanism, a revoluble frictional member, frictional segments adapted to coact with said member, bearing members between ends of and upon which said segments are adapted to oscillate, a cam for operating said bearing members to effect the engagement of said segments with said frictional member, and means for withdrawing said segments from said frictional member.

7. In a braking mechanism, a revoluble wheel having an axis of oscillation transverse to its axis of revolution, a frictional ring fixed to said wheel, frictional segments adapted to oscillate about the axis of oscillation of said wheel, bearings upon which the respective segments are adapted to turn in their action of oscillation, means for spreading said bearings whereby said segments are applied to said ring, and means for automatically withdrawing said segments from said ring.

8. In a braking mechanism, an axle, a knuckle pivotally connected with said axle, a wheel revolubly connected with said knuckle, a frictional ring fixed to said wheel, a pair of frictional segments pivotally connected in relation to said axle so as to oscillate about the axis of oscillation of said knuckle, a pair of bearing members upon which said segments are adapted to turn, a rock shaft having a cam thereon between said bearing members, and means for operating said shaft.

9. In a braking mechanism, a revoluble wheel having an axis of oscillation transverse to its axis of revolution, a ring fixed to said wheel in said axes, segments disposed within said ring and adapted to turn about said axis of oscillation, bearings upon which said segments are adapted to turn in moving about said axis of oscillation, and means disposed in said axis of oscillation for spreading said bearings to effect the application of said segments to said ring.

10. In a braking mechanism, the combination with an axle, a knuckle journaled relatively thereto and a wheel journaled relatively to said knuckle, of a frictional band fixed to said wheel in the plane of the journals of said knuckle, frictional segments within said band, said segments being journaled relatively to said axle so as to turn about the axis of oscillation of said band, bearings on either side of said axis relatively to which said segments are adapted to turn, a cam disposed in said axis between said bearings, and means for operating said cam to operate said bearings and segments.

11. In a braking mechanism, in combination with a revoluble traction wheel having a friction ring thereon and means whereby said wheel is adapted to oscillate on an axis transverse to its axis of revolution, frictional clutching mechanism coacting with said ring, said clutching mechanism having an axis of oscillation coincident with the axis of oscillation of said wheel, and means coacting with said clutching mechanism for automatically applying and manually releasing the same, said means comprising a movable platform, a lever connected with and operated by said platform, a rock shaft, means whereby said lever rocks said shaft and means operated by said shaft relative whereto said clutching mechanism turns and by which it is operated.

12. In a braking mechanism, the combination with a vehicle wheel and a frame, of platforms movably connected to the respective ends of said frame, means for connecting said platforms whereby the lowering of one elevates the other, frictional means for braking said wheel, and mechanism whereby said platforms are adapted to control the operation of said frictional means.

13. In a braking mechanism, the combination with a vehicle frame and wheels, of platforms hinged to the respective ends of said frame, means comprising flexible members connecting said platforms whereby the depression of one elevates the other, frictional means for braking said wheels, mechanisms operated by the depression of the respective platforms for disengaging said frictional means, and mechanism for automatically applying said frictional means.

14. In a braking mechanism, the combination of a frame, traction wheels, and automatically braking one or more of said wheels, a movable platform, means whereby the depression of said platform releases said braking devices, a lever movable independently of and adapted to be moved by said platform, and means whereby said lever operates said devices to effect the braking operation.

15. In a braking mechanism, the combination of a frame, traction wheels, and knuckles for supporting said frame on said wheels, with friction rings fixed to the respective wheels, brake shoes adapted for engaging said rings, bearings curved about axes substantially coincident with the axes of said knuckles, means for spreading said bearings to apply said shoes to said rings, platforms movable relatively to said frame, levers movable independently of and adapted to be moved by said platforms, and means whereby said levers are respectively adapted for operating said spreading means.

In witness whereof, I have hereunto set my name this 23d day of March, 1910, in the presence of the subscribing witnesses.

TRACY V. BUCKWALTER.

Witnesses:
P. H. MARKLEY,
J. F. MEEK.